US008259800B2

(12) United States Patent
Wang

(10) Patent No.: US 8,259,800 B2
(45) Date of Patent: Sep. 4, 2012

(54) METHOD, DEVICE AND SYSTEM FOR EFFECTIVELY CODING AND DECODING OF VIDEO DATA

(75) Inventor: Ye-Kui Wang, Tampere (FI)

(73) Assignee: Nokia Corporation (FI)

( * ) Notice: Subject to any disclaimer, the term of this patent is extended or adjusted under 35 U.S.C. 154(b) by 1350 days.

(21) Appl. No.: 11/391,723

(22) Filed: Mar. 27, 2006

(65) Prior Publication Data

US 2006/0251169 A1 Nov. 9, 2006

Related U.S. Application Data

(60) Provisional application No. 60/671,213, filed on Apr. 13, 2005.

(51) Int. Cl.
*H04N 7/12* (2006.01)
(52) U.S. Cl. .................................... 375/240.12
(58) Field of Classification Search ........................ None
See application file for complete search history.

(56) References Cited

U.S. PATENT DOCUMENTS

| 5,988,863 | A | 11/1999 | Demos | |
|---|---|---|---|---|
| 6,330,280 | B1 | 12/2001 | Suzuki et al. | |
| 6,816,194 | B2 | 11/2004 | Zhang et al. | |
| 2002/0021761 | A1 | 2/2002 | Zhang et al. | |
| 2005/0129123 | A1 | 6/2005 | Xu et al. | |
| 2005/0259729 | A1* | 11/2005 | Sun | 375/240.1 |
| 2006/0013305 | A1* | 1/2006 | Sun | 375/240.12 |
| 2009/0285309 | A1* | 11/2009 | Wiegand | 375/240.25 |
| 2011/0038421 | A1* | 2/2011 | Schwarz et al. | 375/240.16 |

FOREIGN PATENT DOCUMENTS

| KR | 102006012266 | 11/2006 |
|---|---|---|
| RU | 2201654 | 3/2003 |
| WO | WO 01/03441 | 1/2001 |

OTHER PUBLICATIONS

"Scalable Video Coding—Working Draft 1"; Joint Video Team (JVT) of ISO/IEC MPEG & ITU-T VCEG (ISO/IEC JTC1/SC29/WG11 and ITU-T SG16 Q.6), 14the Meeting: Hong Kong, CN, Jan. 17-21, 2005; whole document.
"Advanced video coding for generic audiovisual services", ITU-T Standard Pre-Published (P), International Telecommunication Union, Geneva, CH., No. H264 3/5, Mar. 1, 2005; whole document.
Richardson; "H.264 and MPEG-4 Video Compression, Video Coding for Next-generation Multimedia", John Wiley & Sons Ltd., 2003, ISBN 94836-041-5; pp. 186-206.

* cited by examiner

*Primary Examiner* — Leon-Viet Nguyen
(74) *Attorney, Agent, or Firm* — Alston & Bird LLP

(57) ABSTRACT

Methods and devices for video encoding and decoding, where video data is obtained, followed by generating a base layer based thereon, the base layer comprising at least one picture, generating at least one enhancement layer based on the obtained video data, the enhancement layer comprising at least one picture, generating a dependency identifier for each of the base and enhancement layers, each dependency identifier being associated with a reference number; determining a respective sequence parameter set for each of the base layer and the enhancement layer having different dependency identifier values, wherein for a number of base and enhancement layers having sequence parameter set parameters substantially the same, using one sequence parameter set; and encoding the base layer and the at least one enhancement layer by using determined sequence parameter sets.

8 Claims, 9 Drawing Sheets

(State of the Art)**

METHOD, DEVICE AND SYSTEM FOR EFFECTIVELY CODING AND DECODING OF VIDEO DATA

CROSS-REFERENCE TO RELATED APPLICATION

This application claims priority under 35 USC §119 to U.S. Provisional Patent Application No. 60/671,213 filed on Apr. 13, 2005.

FIELD OF THE INVENTION

The present invention relates to the field of video encoding and decoding, and more specifically to scalable video data processing.

BACKGROUND OF THE INVENTION

Conventional video coding standards (e.g. MPEG-1, H.261/263/264) incorporate motion estimation and motion compensation to remove temporal redundancies between video frames. These concepts are very familiar for skilled readers with a basic understanding of video coding, and will not be described in detail.

The working draft 1.0 of the scalable extension to H.264/AVC [1] currently enables coding of multiple scalable layers with different values of dependency identifications (DependencyId). Accordingly each layer comprises a dependency identification and, for a coded video sequence, respectively a certain sequence parameter set (SPS). A coded video sequence consists of successive coded pictures from an instantaneous decoding refresh (IDR) picture to the next IDR picture, exclusively. Any picture that succeeds an IDR picture in decoding order shall not use inter prediction reference from prior to the IDR picture in decoding order. The sequence parameter set includes among other things data which will be used on the decoder side for a proper decoding operation.

There are two main disadvantages associated with the current coding methods according to the present state of the art. First, if a scalable presentation point with DependencyId equal to 7 is desired, and all the lower layers with DependencyId equal to 0 to 6 are required, then at least 8 sequence parameter sets have to be transmitted for the presentation or decoding operation, respectively. However, if no SPS parameters other than the seq_parameter_id need to be changed which is possible if the spatial resolutions are equal for all layers, then those certain and substantially identical SPSs are actually redundantly transmitted. Since SPSs are typically transmitted in the session beginning in a reliable and out-of-band way, reception acknowledgements are needed and retransmission may be used. Thus, increased amount of data to be sent means longer session setup delay, which is unwanted for the end user experience.

A second disadvantage relates to flexibility and coding efficiency. The maximum number of initial SPSs is 32. If a scalable presentation point with DependencyId equal to 7 is desired, and all the lower layers with DependencyID equal to 0 to 6 are required, then in average coding the layer(s) of each value of DependencyId may have at most only 4 SPS variations. Therefore the flexibility and possibly also coding efficiency is lowered compared to that 32 SPS variations could have been used. Updating an SPS during a video session could solve this problem. However, during a video transport session SPS updating may easily cause problem because of loss of the synchronization between the updated SPS and those NAL units referencing it. In addition, if the update is done using the in-band way, e.g. transmitted using Real-time Transport Protocol (RTP) together with the coded video slices, it may get lost.

SUMMARY OF THE INVENTION

The object of the present invention is to provide a methodology, a device, and a system for efficiently encoding or decoding, respectively which overcomes the above mentioned problems of the state of the art and provides an effective coding avoiding redundancies.

The objects of the present invention are solved by the subject matter defined in the accompanying independent claims.

According to one aspect of the present inventive operation the constraint that a sequence parameter set (SPS) is activated for each value of DependencyId may be removed. Rather, a new SPS is activated only when it is needed. A new sequence is only needed when at least one SPS parameter other than seq_parameter_set_id change is required. The invention may be used in any application that applies scalable video coding, wherein one or more sequence parameter sets are used for coding.

The main advantages reside in that sequence parameter sets can be used more efficiently such that the initial session setup delay is reduced and more sequence parameter sets can be used for a certain scalable layer such that the scalable layer can be encoded in a more flexible way and improved coding efficiency due to the flexibility is also attained.

The encoding/decoding methods and operations according to the present invention are for specified, only the sake of simplicity, for one coded video sequence, but an adaptation for multiply coded video sequences is contemplated within the scope of the present invention.

According to a first aspect of the present invention, a method for scalable encoding of video data is provided. According to a first operation obtaining of said video data is provided. Then obtaining said video data is carried out, followed by generating a base layer based on said obtained video data, the base layer comprising at least one picture, generating at least one enhancement layer based on said obtained video data, the at least one enhancement layer comprising at least one picture, generating a dependency identifier (DependencyID) for each of said base and enhancement layers, each DependencyID being associated with a reference number; determining a respective sequence parameter set (SPS) for each of said base layer and said at least one enhancement layer having different DependencyID values, wherein for a number of base and enhancement layers having SPS parameters substantially the same, using one SPS; and encoding said base layer and said at least one enhancement layer by using determined SPS's.

According to the inventive operation of the present invention, reuse of a certain sequence parameter set in scalable layers with different values of DependencyId is enabled.

According to a preferred embodiment generating of said base layer and said at least one enhancement layer is based on motion information within said video data, said motion information being provided by a motion estimation process.

According to a preferred embodiment said sequence parameter set (SPS) comprises an SPS identifier, said SPS identifier being referred to by picture parameter set further referred in a slice header. Thereby exact identification of certain SPS within a plurality of sequence parameter sets is enabled According to a preferred embodiment said DependencyID's for at least two of the group of said base layer and at least one enhancement layer are the same.

According to a preferred embodiment said SPS further comprises at least one of the group comprising profile information, level information, chroma format information, picture size information and frame crop information.

According to another aspect of the present invention, a method for decoding scalable encoded video data is provided. Said method comprises a operation for: obtaining said encoded video data, identifying a base layer and at least one enhancement layer within said encoded video data, detecting a dependency identification (DependencyID) for each of said base and at least one enhancement layer, said dependency identifications having reference numerals, and for at least two layers with same SPS parameters one SPS is used, and decoding said base layer and said decoded at least one enhancement layer by using each of said determined sequence parameter sets (SPS).

According to another aspect of the present invention there is also provided an encoding device, operative according to a method for encoding as above.

According to another aspect of the present invention there is also provided a decoding device, operative according to a method for decoding as above.

According to another aspect of the present invention there is also provided a system for supporting data transmission, operative according to a method for encoding and/or decoding as above.

According to another aspect of the present invention there is also provided a data transmission system, including at least one encoding device and at least one decoding device.

According to another aspect of the present invention there is also provided a computer program product comprising a computer readable storage structure embodying computer program code thereon for execution by a computer processor hosted by an electronic device, wherein said computer program code comprises instructions for performing a method for encoding as above.

According to another aspect of the present invention there is also provided a computer program product comprising a computer readable storage structure embodying computer program code thereon for execution by a computer processor hosted by an electronic device, wherein said computer program code comprises instructions for performing a method for decoding as above.

According to another aspect of the present invention there is also provided a computer data signal embodied in a carrier wave and representing instructions, which when executed by a processor cause the operations of anyone of the preceding encoding and/or decoding methods to be carried out.

According to another aspect of the present invention a module for scalable encoding of video data is provided, said module comprising at least: a component for obtaining said video data; a component for generating a base layer based on said obtained video data; a component for generating at least one enhancement layer comprising at least one picture, a component for generating a dependency identification (DependencyID) for each of said base and enhancement layers, each dependencyID being associated with a reference number; a component for determining the respective sequence parameter set (SPS) for each of said base and said at least one enhancement layers having different DependencyID values, wherein for a number of base and enhancement layers having SPS parameters substantially the same, using one SPS; and a component for encoding said base layer and said at least one enhancement layer by using determined SPS's.

According to another aspect of the present invention a module for decoding scalable encoded video data is provided, comprising at least: a component for obtaining said encoded video data, a component for identifying a base layer and at least one enhancement layer within said encoded video data, a component for detecting a dependency identification (DependencyID) for each of said enhancement layers, said dependency identifications having reference numerals and for at least two layers with the same SPS parameters one SPS is used, a component for decoding said base layer and said decoded enhancement layers by using said determined sequence parameter sets.

Advantages of the present invention will become apparent to the reader of the present invention when reading the detailed description referring to embodiments of the present invention, based on which the inventive concept is easily understandable.

Throughout the detailed description and the accompanying drawings the same or similar components, units, or devices will be referenced by same reference numerals for clarity purposes.

It shall be noted that the designations portable device and mobile device are used synonymously throughout the description.

SHORT DESCRIPTION OF THE DRAWINGS

The accompanying drawings are included to provide a further understanding of the invention, and are incorporated in and constitute a part of this specification. The drawings illustrate embodiments of the present invention and together with the description serve to explain the principles of the invention. In the drawings, FIG. 1 schematically illustrates an example block diagram for a portable CE device embodied exemplarily on the basis of a cellular terminal device;

Even though the invention is described above with reference to embodiments according to the accompanying drawings, it is clear that the invention is not restricted thereto but it can be modified in several ways within the scope of the appended claims.

In the following description of the various embodiments, reference is made to the accompanying drawings which form a part thereof, and in which is shown by way of illustration various embodiments in which the invention may be practiced. It is to be understood that other embodiments may be utilized and structural and functional modifications may be made without departing from the scope of the invention.

Wherever possible same reference numbers are used throughout drawings and description to refer to similar or like parts.

DETAILED DESCRIPTION OF THE DRAWINGS

Figure 1:
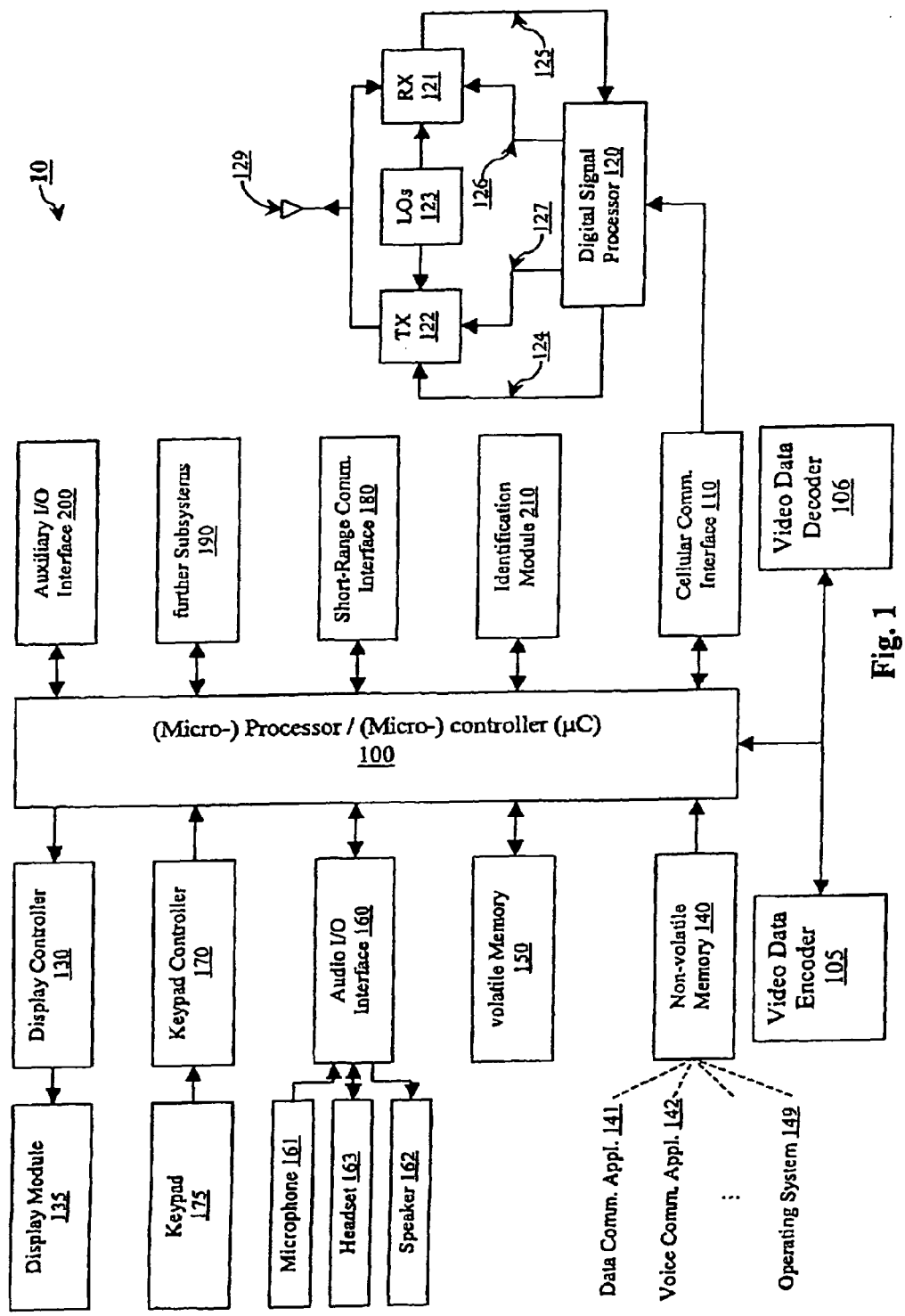

FIG. 1 depicts a typical mobile device according to an embodiment of the present invention. The mobile device 10 shown in FIG. 1 is capable for cellular data and voice communications. It should be noted that the present invention is not limited to this specific embodiment, which represents for the way of illustration one embodiment out of a multiplicity of embodiments. The mobile device 10 includes a (main) microprocessor or microcontroller 100 as well as components associated with the microprocessor controlling the operation of the mobile device. These components include a display controller 130 connecting to a display module 135, a non-volatile memory 140, a volatile memory 150 such as a random access memory (RAM), an audio input/output (I/O) interface 160 connecting to a microphone 161, a speaker 162 and/or a headset 163, a keypad controller 170 connected to a keypad 175 or keyboard, any auxiliary input/output (I/O) interface 200, and a short-range communications interface 180. Such a device also typically includes other device subsystems shown generally at 190.

The mobile device 10 may communicate over a voice network and/or may likewise communicate over a data network, such as any public land mobile networks (PLMNs) in form of e.g. digital cellular networks, especially GSM (global system for mobile communication) or UMTS (universal mobile telecommunications system). Typically the voice and/or data communication is operated via an air interface, i.e. a cellular communication interface subsystem in cooperation with further components (see above) to a base station (BS) or node B (not shown) being part of a radio access network (RAN) of the infrastructure of the cellular network. The cellular communication interface subsystem as depicted illustratively with reference to FIG. 1 comprises the cellular interface 110, a digital signal processor (DSP) 120, a receiver (RX) 121, a transmitter (TX) 122, and one or more local oscillators (LOs) 123 and enables the communication with one or more public land mobile networks (PLMNs). The digital signal processor (DSP) 120 sends communication signals 124 to the transmitter (TX) 122 and receives communication signals 125 from the receiver (RX) 121. In addition to processing communication signals, the digital signal processor 120 also provides for receiver control signals 126 and transmitter control signal 127. For example, besides the modulation and demodulation of the signals to be transmitted and signals received, respectively, the gain levels applied to communication signals in the receiver (RX) 121 and transmitter (TX) 122 may be adaptively controlled through automatic gain control algorithms implemented in the digital signal processor (DSP) 120. Other transceiver control algorithms could also be implemented in the digital signal processor (DSP) 120 in order to provide more sophisticated control of the transceiver 122. In case the mobile device 10 communications through the PLMN occur at a single frequency or a closely-spaced set of frequencies, then a single local oscillator (LO) 128 may be used in conjunction with the transmitter (TX) 122 and receiver (RX) 121. Alternatively, if different frequencies are utilized for voice/data communications or transmission versus reception, then a plurality of local oscillators 128 can be used to generate a plurality of corresponding frequencies. Although the antenna 129 depicted in FIG. 1 or a diversity antenna system could be used (not shown), the mobile device 10 could be used with a single antenna structure for signal reception as well as transmission. Information, which includes both voice and data information, is communicated to and from the cellular interface 110 via a data link between the digital signal processor (DSP) 120. The detailed design of the cellular interface 110, such as frequency band, component selection, power level, etc., will be dependent upon the wireless network in which the mobile device 100 is intended to operate.

After any required network registration or activation procedures, which may involve the subscriber identification module (SIM) 210 required for registration in cellular networks, have been completed, the mobile device 10 may then send and receive communication signals, including both voice and data signals, over the wireless network. Signals received by the antenna 129 from the wireless network are routed to the receiver 121, which provides for such operations as signal amplification, frequency down conversion, filtering, channel selection, and analog to digital conversion. Analog to digital conversion of a received signal allows more complex communication functions, such as digital demodulation and decoding, to be performed using the digital signal processor (DSP) 120. In a similar manner, signals to be transmitted to the network are processed, including modulation and encoding, for example, by the digital signal processor (DSP) 120 and are then provided to the transmitter 122 for digital to analog conversion, frequency up conversion, filtering, amplification, and transmission to the wireless network via the antenna 129.

The microprocessor/microcontroller (μC) 110, which may also be designated as a device platform microprocessor, manages the functions of the mobile device 10. Operating system software 149 used by the processor 110 is preferably stored in a persistent store such as the non-volatile memory 140, which may be implemented, for example, as a Flash memory, battery backed-up RAM, any other non-volatile storage technology, or any combination thereof. In addition to the operating system 149, which controls low-level functions as well as (graphical) basic user interface functions of the mobile device 10, the non-volatile memory 140 includes a plurality of high-level software application programs or modules, such as a voice communication software application 142, a data communication software application 141, an organizer module (not shown), or any other type of software module (not shown). These modules are executed by the processor 100 and provide a high-level interface between a user of the mobile device 10 and the mobile device 10. This interface typically includes a graphical component provided through the display 135 controlled by a display controller 130 and input/output components provided through a keypad 175 connected via a keypad controller 170 to the processor 100, an auxiliary input/output (I/O) interface 200, and/or a short-range (SR) communication interface 180. The auxiliary I/O interface 200 comprises especially a USB (universal serial bus) interface, serial interface, MMC (multimedia card) interface and related interface technologies/standards, and any other standardized or proprietary data communication bus technology, whereas the short-range communication interface may be a radio frequency (RF) low-power interface including especially WLAN (wireless local area network) and Bluetooth communication technology or an IRDA (infrared data access) interface. The RF low-power interface technology referred to herein should especially be understood to include any IEEE 801.xx standard technology, which description is obtainable from the Institute of Electrical and Electronics Engineers. Moreover, the auxiliary I/O interface 200 as well as the short-range communication interface 180 may each represent one or more interfaces supporting one or more input/output interface technologies and communication interface technologies, respectively. The operating system, specific device software applications or modules, or parts thereof, may be temporarily loaded into a volatile store 150 such as a random access memory (typically implemented on the basis of DRAM (direct random access memory) technology for faster operation. Moreover, received communication signals may also be temporarily stored to volatile memory 150, before permanently writing them to a file system located in the non-volatile memory 140 or any mass storage preferably detachably connected via the auxiliary I/O interface for storing data. It should be understood that the components described above represent typical components of a traditional mobile device 10 embodied herein in form of a cellular phone. The present invention is not limited to these specific components and their implementation depicted merely for the way for illustration and sake of completeness.

An exemplary software application module of the mobile device 10 is a personal information manager application providing PDA functionality including typically a contact manager, calendar, a task manager, and the like. Such a personal information manager is executed by the processor 100, may have access to the components of the mobile device 10, and may interact with other software application modules. For instance, interaction with the voice communication software application allows for managing phone calls, voice mails, etc., and interaction with the data communication software application enables for managing SMS (short message service), MMS (multimedia service), e-mail communications and other data transmissions. The non-volatile memory 140 preferably provides a file system to facilitate permanent storage of data items on the device including particularly calendar entries, contacts etc. The ability for data communication with networks, e.g. via the cellular interface, the short-range communication interface, or the auxiliary I/O interface enables upload, download, and synchronization via such networks.

The application modules 141 to 149 represent device functions or software applications that are configured to be executed by the processor 100. In most known mobile devices, a single processor manages and controls the overall operation of the mobile device as well as all device functions and software applications. Such a concept is applicable for today's mobile devices. Especially the implementation of enhanced multimedia functionalities includes for example reproducing of video streaming applications, manipulating of digital images, and video sequences captured by integrated or detachably connected digital camera functionality but also gaming applications with sophisticated graphics drives the requirement of computational power. One way to deal with the requirement for computational power, which has been pursued in the past, solves the problem for increasing computational power by implementing powerful and universal processor cores. Another approach for providing computational power is to implement two or more independent processor cores, which is a well known methodology in the art. The advantages of several independent processor cores can be immediately appreciated by those skilled in the art. Whereas a universal processor is designed for carrying out a multiplicity of different tasks without specialization to a pre-selection of distinct tasks, a multi-processor arrangement may include one or more universal processors and one or more specialized processors adapted for processing a predefined set of tasks. Nevertheless, the implementation of several processors within one device, especially a mobile device such as mobile device 10, requires traditionally a complete and sophisticated redesign of the components.

In the following, the present invention will provide a concept which allows simple integration of additional processor cores into an existing processing device implementation enabling the omission of expensive complete and sophisticated redesign. The inventive concept will be described with reference to system-on-a-chip (SoC) design. System-on-a-chip (SoC) is a concept of integrating at least numerous (or all) components of a processing device into a single high-integrated chip. Such a system-on-a-chip can contain digital, analog, mixed-signal, and often radio-frequency functions—all on one chip. A typical processing device comprises a number of integrated circuits that perform different tasks. These integrated circuits may include especially microprocessor, memory, universal asynchronous receiver-transmitters (UARTs), serial/parallel ports, direct memory access (DMA) controllers, and the like. A universal asynchronous receiver-transmitter (UART) translates between parallel bits of data and serial bits. The recent improvements in semiconductor technology caused by very-large-scale integration (VLSI) integrated circuits enable a significant growth in complexity, making it possible to integrate numerous components of a system in a single chip. With reference to FIG. 1, one or more components thereof, e.g. the controllers 130 and 160, the memory components 150 and 140, and one or more of the interfaces 200, 180 and 110, can be integrated together with the processor 100 in a signal chip which forms finally a system-on-a-chip (Soc).

Additionally, said device 10 is equipped with a module for scalable encoding 105 and decoding 106 of video data according to the inventive operation of the present invention. By means of the CPU 100 said modules 105, 106 may individually be used. However, said device 10 is adapted to perform video data encoding or decoding respectively. Said video data may be received by means of the communication modules of the device or it also may be stored within any imaginable storage means within the device 10.

Figure 2:
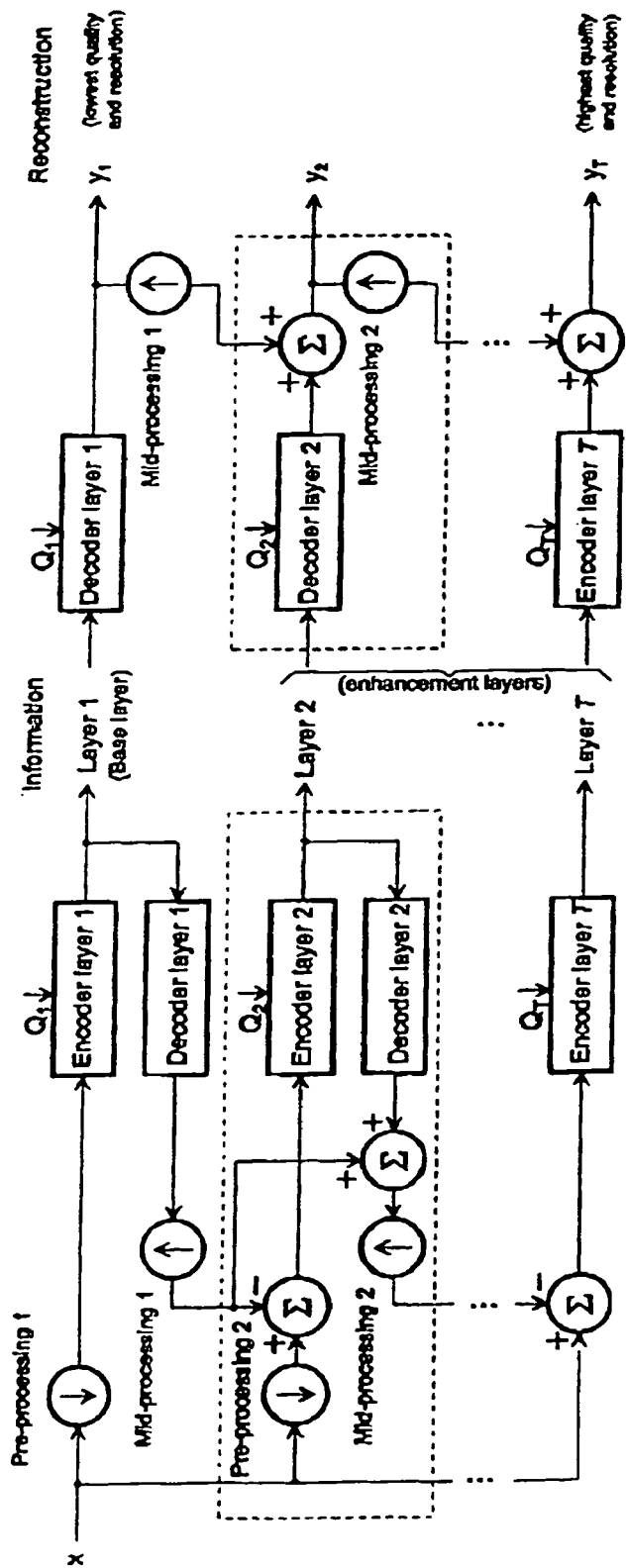
FIG. 2 is a general principle of scalable coding and decoding of video data according the state of the art.

A very general principle of (layered) scalable coding and decoding is shown in FIG. 2, where by supplementing further building blocks of the intermediate-level type (highlighted by a dotted rectangle), an arbitrary number of scalable layers can in principle be realized. The spatiotemporal signal resolution to be represented by the base layer is first generated by decimation (preprocessing). In the subsequent encoding stage, an appropriate setting of the quantizer will then lead to a certain overall quality level of the base information.

The base-layer reconstruction is an approximation of all the higher layer resolution levels and can be utilized in the decoding of the subsequent layers. The midprocessing unit performs up-sampling of the next lower layer signal to the subsequent layer's resolution. Typically, preprocessing and midprocessing are performed by decimation and interpolation throughout all stages, whereas the particular action to be taken can be quite different depending on the dimension of scalability, e.g., motion-compensated processing can be implemented for frame-rate up-sampling in temporal scalability. The information is propagated from the lower into the higher resolution layers both during encoding and decoding. In all types of scalability (temporal, spatial, or quantization/quality), the constraints imposed by the frame-recursive processing of hybrid video coding have to be carefully considered. The base layer and any composition from layers should in the ideal case be self-contained, which means that the prediction should not use any decoded information from higher layers. Otherwise, different estimates would be used at the encoder and decoder sides, and a drift effect would occur. The prediction of the base-layer information will, however, always be worse than it could be if all enhancement layer information was allowed in the prediction. This does not penalize the operation of the coder at the base layer, which will implicitly perform like a single-layer coder at the same rate; however, as the base-layer information is used for prediction of the enhancement layer, the rate-distortion performance toward higher rates will be worse than it could be in a single-layer coder.

Figure 3:
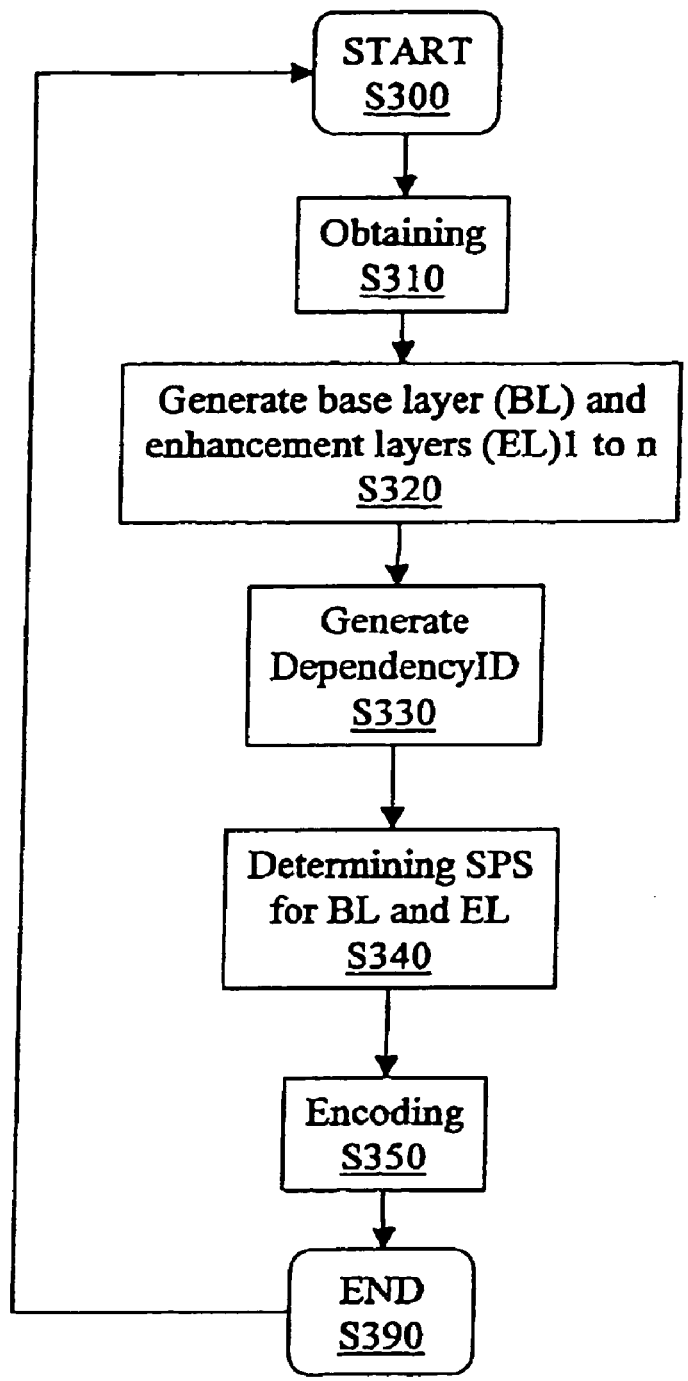
FIG. 3 depicts an operational sequence showing the encoding side in accordance with the present invention.

FIG. 3 shows an operational sequence of the encoding method in accordance with the present invention. In an operational operation S300 the sequence may be started. This may correspond for instance to the receiving of a video data stream from a camera or the like. Said camera may be incorporated within the above mentioned device 10. After obtaining S310 said video data stream the encoder may generate or create, respectively the corresponding base layer (BL) and its enhancement layers (EL), as shown according to the operational operation S320. It is imaginable to implement only one EL but creating of more EL results in better encoding and thereby further increased decoding quality.

After generating the base layer and also the enhancement layers an operation S330 follows corresponding to generating of the corresponding dependency identifications (DependencyID) of the BL and EL as well. The value of the DependencyID will increase if more than one enhancement layer will be used.

In an operation S340, determining the respective sequence parameter set (SPS) for each of said base layer and all said enhancement layers is provided, wherein for a number of base or enhancement layers if the selected SPS parameters are substantially equal, only one SPS is used. According to the inventive operation of the present invention only one SPS may be used for different DependencyId values resulting in effective encoding operation because redundant data will be removed. After determining said SPS which shall be used, the encoding operation S350 will start. In this operation the base layer and enhancement layers and also optional information like motion vectors or the like are multiplexed resulting in a bit stream, or encoded video data stream which is now ready for further processing.

If no operations follow, the operational sequence will come to an end S390 and may be restarted according to a new iteration or if for instance a no raw video data sequence is to be encoded. However, said resulting encoded video data stream may be sent to a receiver which may be adapted to decode or store said data. The decoding process will be nearly described with reference to FIG. 4 in the following.

Figure 4:
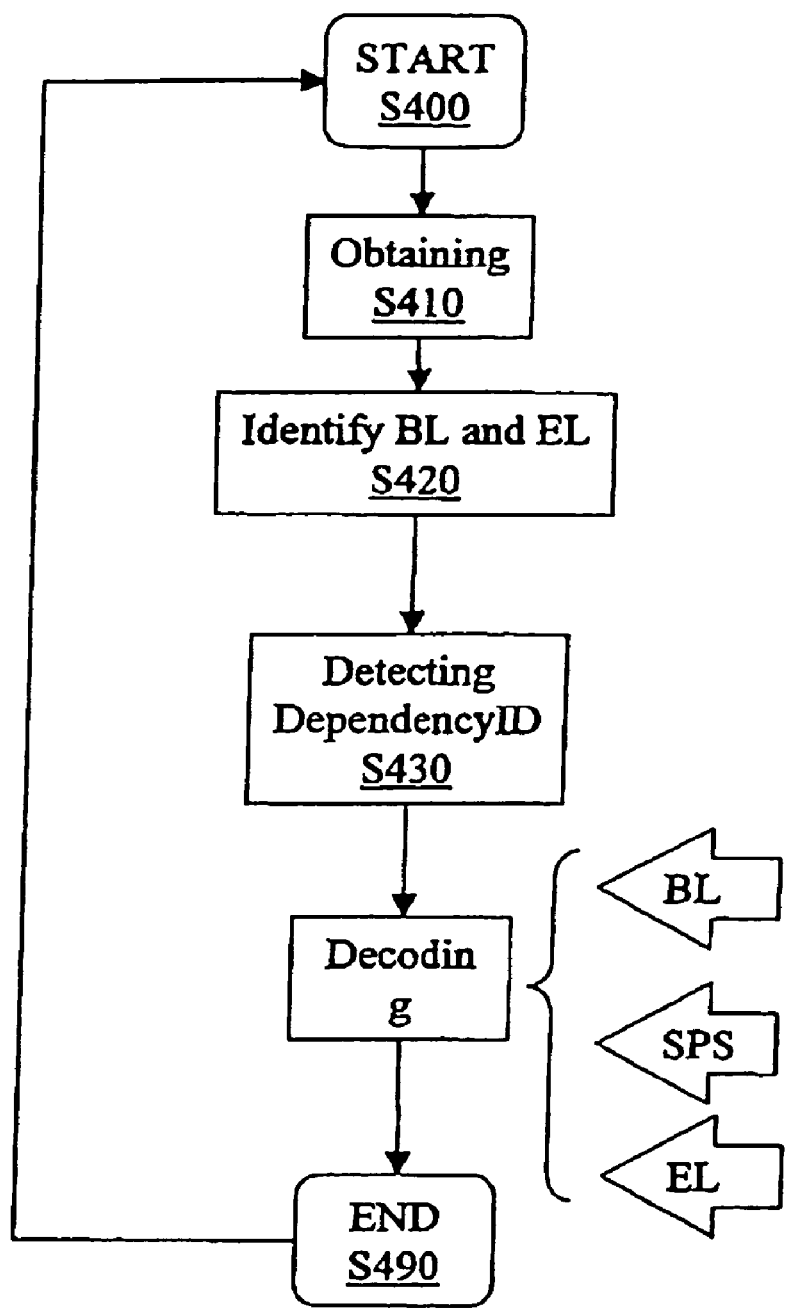
FIG. 4 depicts an operational sequence showing the decoding side in accordance with the present invention.

FIG. 4 depicts an encoding operational sequence in accordance with the present invention. After receiving of scalable encoded video data the operational sequence starts S400. After obtaining S410 said encode video data, the base layer and the corresponding one or more enhancement layers may be identified according the operational operation S420. This means that the received and encoded video data stream will be demultiplexed and accordingly divided in BL, and EL and optionally additional information like motion vectors (MV) or the like. On the basis of the received data stream the DependencyID will be detected and also the sequence parameter set (SPS) which shall be used will be identified. In an operational operation S450, decoding of said scalable encoded data will be provided under consideration of the previously determined information: BL, SPS and EL.

If no further operations are needed, the method will come to end according to the operation S490 and may be restarted if necessary.

Figure 5A:
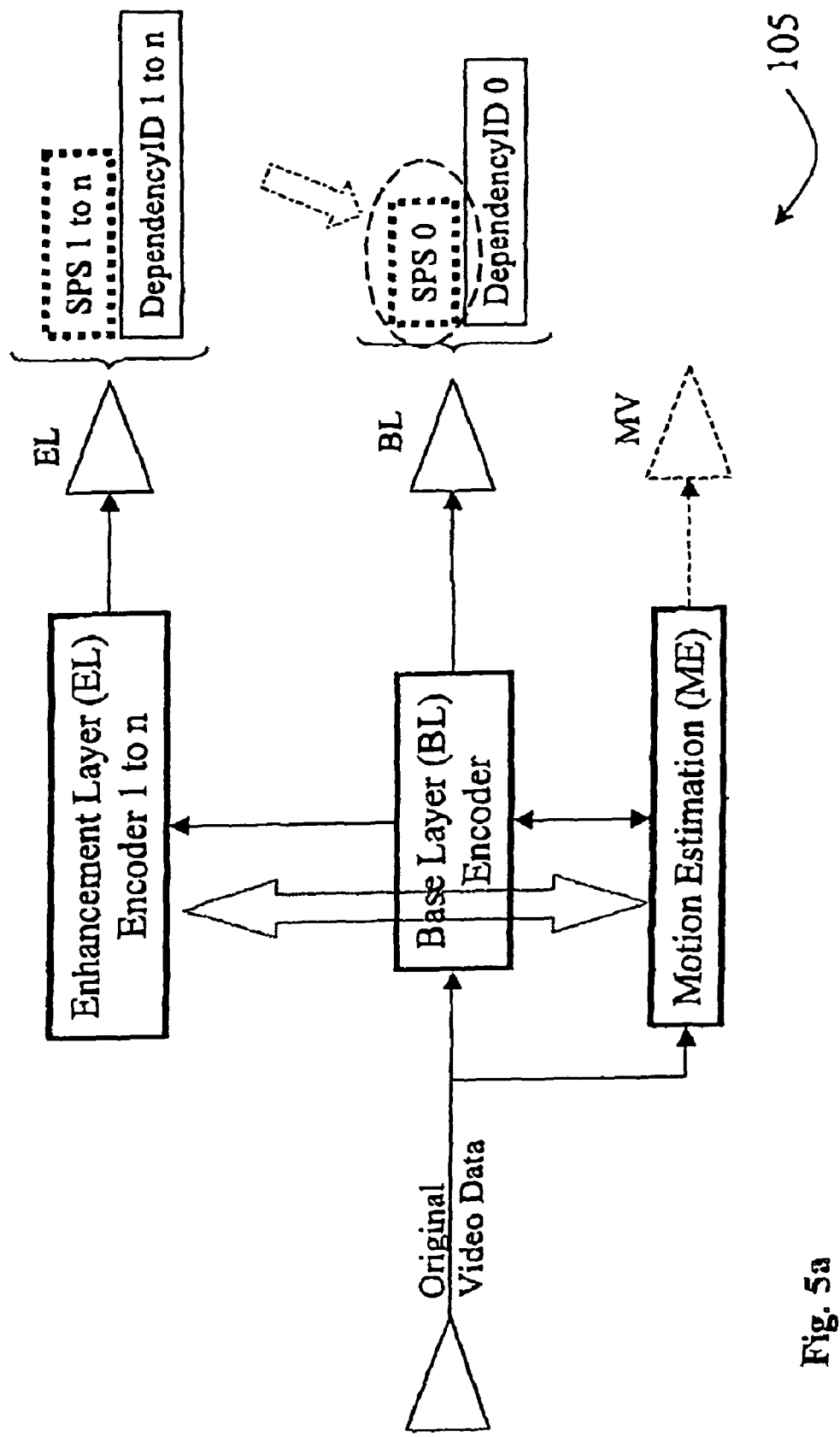
FIG. 5a is a detailed illustration of the encoding principle in accordance with the present invention.

FIG. 5a shows the principle of the scalable encoding process in accordance with the present invention. All processing may be supported by a motion estimator which is depicted with reference to FIG. 5a. The motion estimator uses the video data for generating motion vectors which are further necessary for encoding or picture improvement.

The original video data is used for generating motion vectors and also for generating the base layer BL and the corresponding plurality of enhancement layers EL. The enhancement layers may be generated on the basis of the original video data, on the BL and also optionally on the basis of the information delivered by the motion vectors. For further processing it is imaginable that the motion vectors are also encoded or combined, respectively within the scalable encoded video data stream to perform picture improvement or the like on the decoder side.

Each BL or EL is provided with a DependencyID and with an SPS. In accordance with the inventive operation of the present invention the encoder first determine SPSs to be used and checks if the SPS parameters of any subset of all the base layers and enhancement layers are substantially equal and will use only one SPS for encoding of the subset of layers to avoid redundant further data traffic. FIG. 5a shows a possible detailed embodiment of the scalable encoding module 105 in accordance with the present invention.

Figure 5B:
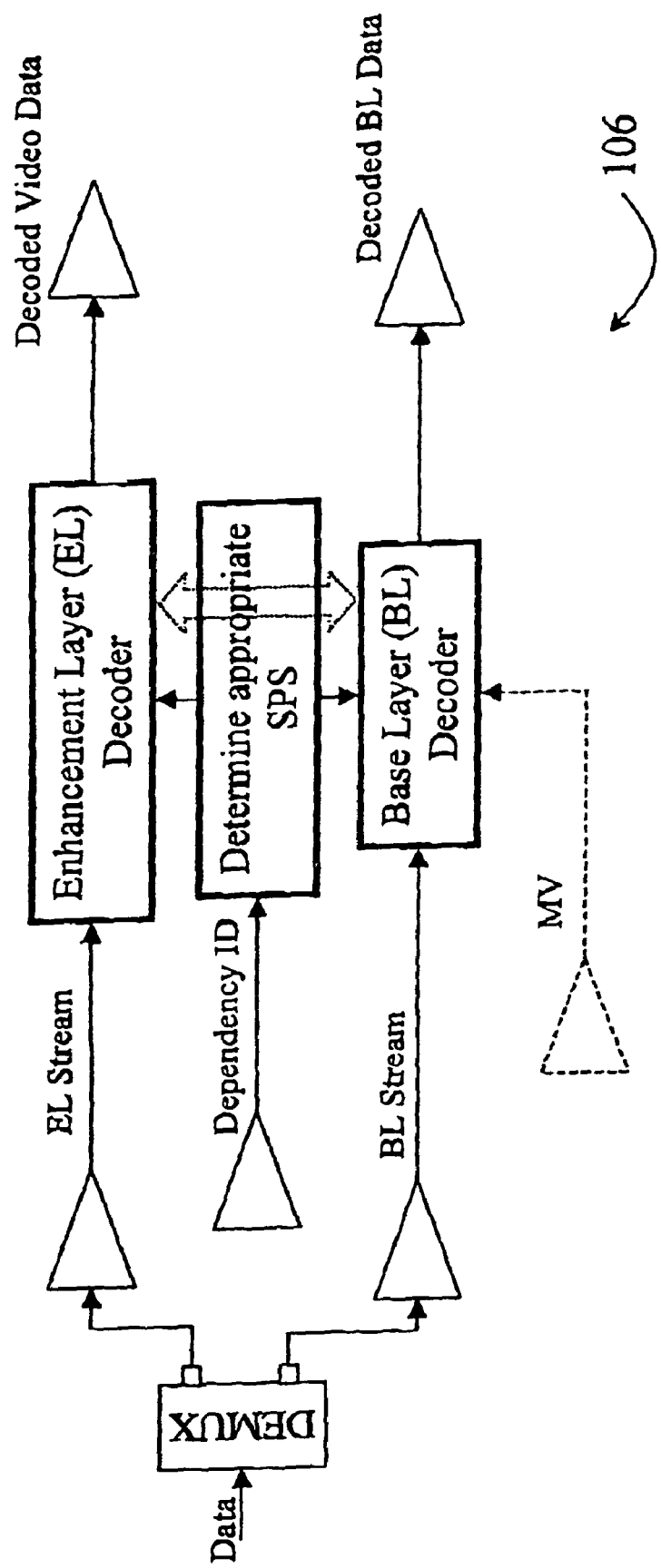
FIG. 5b is a detailed illustration of the decoding principle in accordance with the present invention.

FIG. 5b illustrates a decoder of scalable encoded video data in accordance with the present invention. FIG. 5b is a possible embodiment of the decoding module 106 adapted to process scalable encode video data.

Actually, the module for determining the appropriate SPS is not needed on the decoding side as it is needed on the encoding side. For the sake of completeness the determining module is also shown with reference to FIG. 5b. In formation on which SPS is used in a picture it is signaled by referencing its ID in the picture parameter set, and the picture parameter set ID is further referenced in the slice header.

On the basis of the received data the EL stream, the DependencyId's and the BL stream are identified which is symbolized by a demultiplexer DEMUX. The achieved data streams are now ready for further processing provided by the corresponding EL-Decoder and the BL-decoder. Each of the depicted modules is adapted to interact with each other if needed. The motion vectors are available and shall be used for decoding. According to the used SPS the decoder provides proper decoding resulting in scalable decoded video data.

It is also imaginable that the BL data stream will also be provided as a separate data stream for a certain implementation. The BL data, which is also decoded, may be used if problems within the decoding procedure of the EL's were detected.

Figure 6:
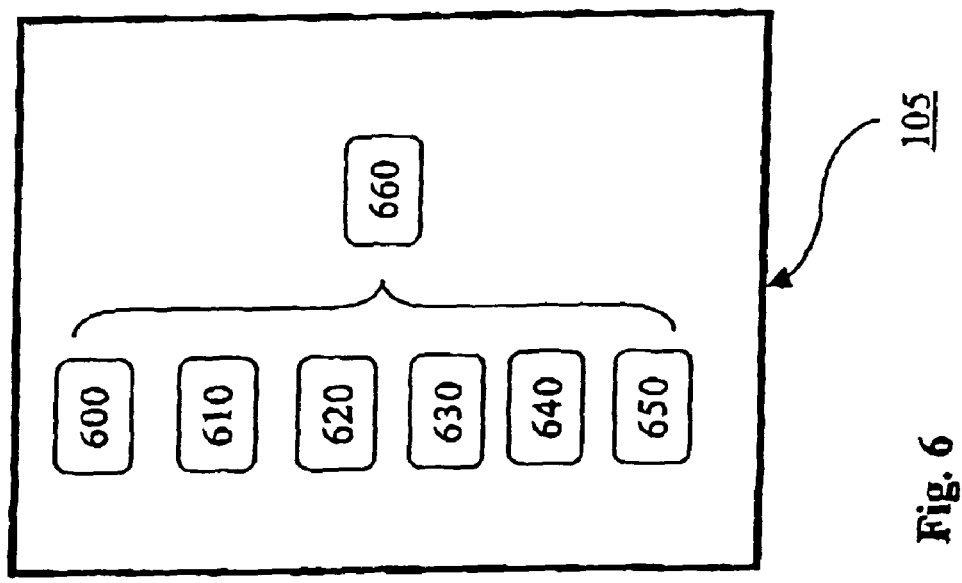
FIG. 6 represents the encoding module in accordance with the present invention showing all components.

FIG. 6 represents the encoding module in accordance with the present invention showing all components needed for encoding. Said module for scalable encoding 105 of video data, comprises: a component for obtaining 610 said video data, a component for generating 620 a base layer based on said obtained video data, a component for generating 630 a predetermined number of corresponding scalable enhancement layers based on said video data and said base layer, a component for generating 640 a dependency identification (DependencyID) for each of said base or enhancement layers, said dependency identifications having subsequent reference numerals, a component for determining 650 the respective sequence parameter set (SPS) for each of said base or enhancement layers, wherein for a number of base or enhancement layers if the selected SPS parameters are substantially equal, only one SPS is used, and a component for encoding 660 said base layer and said enhancement layers by using said respective sequence parameter set.

Figure 7:
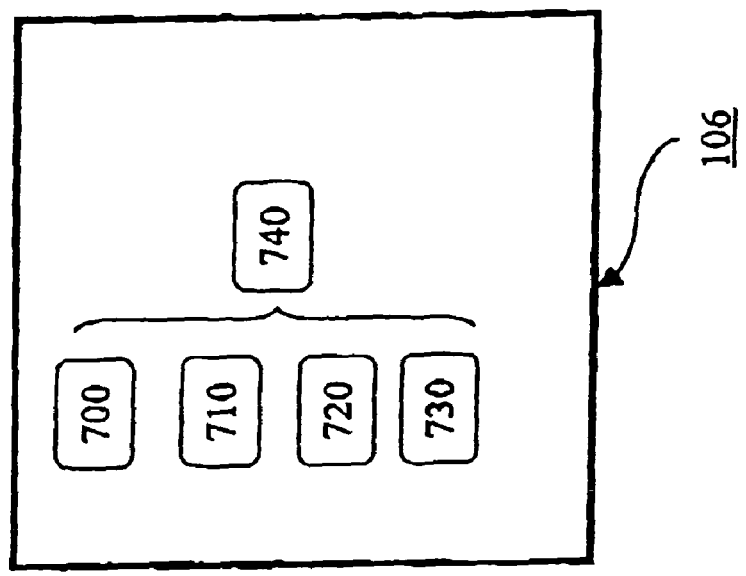
FIG. 7 represents the decoding module in accordance with the present invention showing all components.

FIG. 7 represents the decoding module in accordance with the present invention showing all components needed for decoding. Said module for decoding 105 scalable encoded video data, comprises: a component for obtaining 710 said encoded video data, a component for identifying 720 a base layer and a plurality of enhancement layers within said encoded video data, a component for detecting 730 a dependency identification (DependencyID) for each of said enhancement layers, said dependency identifications having subsequent reference numerals and for at least two layers with different said dependency identifications a same SPS may be used, and a component for decoding 740 said base layer and said decoded enhancement layers by using said used sequence parameter set.

Both modules 105 and 106 may be implemented as software modules or hardware modules or the like.

Figure 8A:
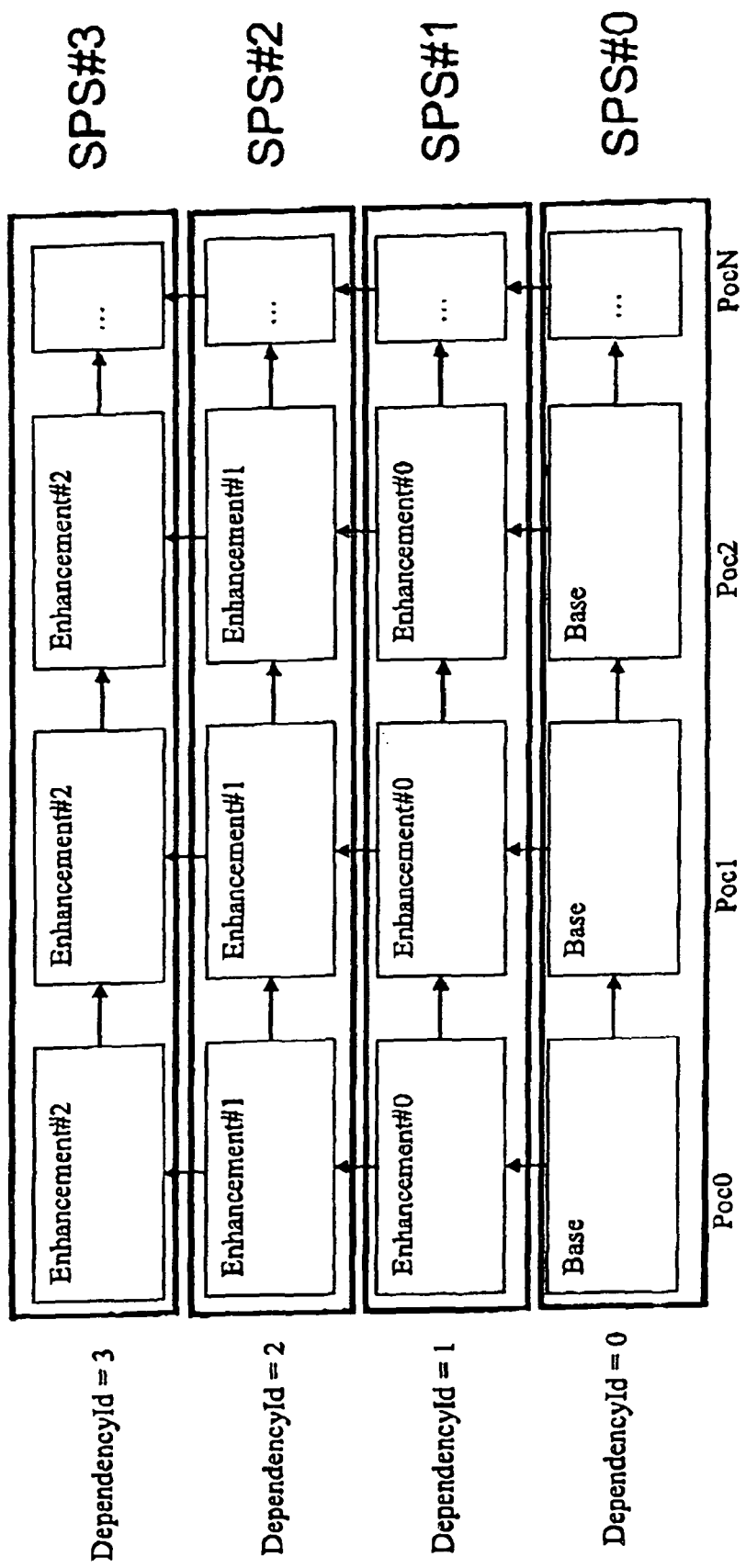
FIG. 8a shows an implementation for encoding video data, wherein each DependencyID receives an SPS.
Figure 8B:
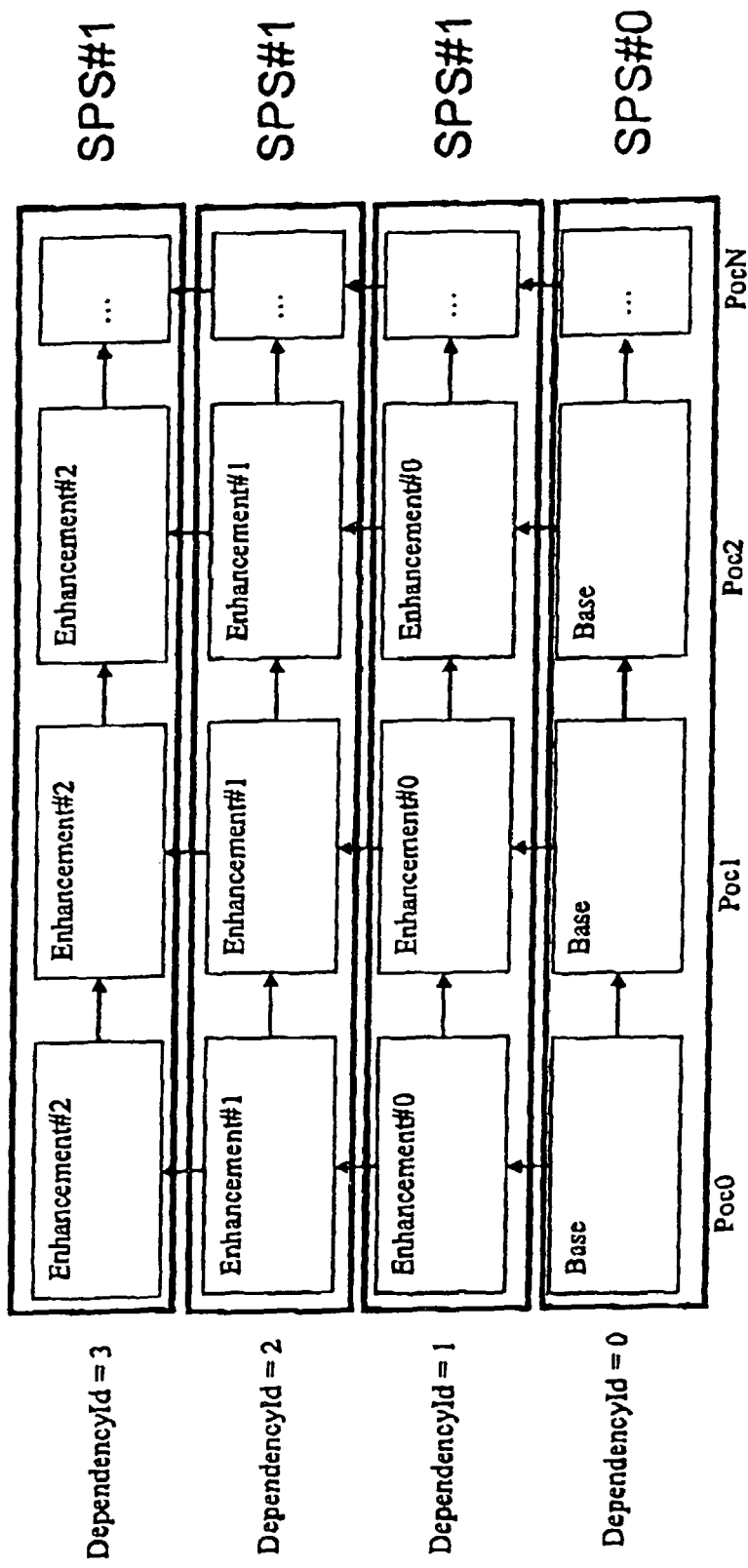
FIG. 8b shows an implementation for encoding video data, wherein one certain SPS is used for coding in accordance with the present invention.

The FIGS. 8a and 8b illustrate the main difference between the scalable encoding method of the state of the art and the method in accordance with the present invention operation. FIG. 8a shows that each DependencyID corresponding to the base layer and the plurality of enhancement layers is provided with an individual sequence parameter set SPS. In opposition to that the encoding method in accordance with the present invention detects if the sequence parameter sets for different DependencyId's are equal and uses only one SPS for coding. In this example only SPS 1 is used for encoding of all the enhancement layers.

Even though the invention is described above with reference to embodiments according to the accompanying drawings, it is clear that the invention is not restricted thereto but it can be modified in several ways within the scope of the appended claims.

What is claimed is:

1. A method comprising:
   encoding video into a scalable bitstream by generating a plurality of enhancement layers;
   generating dependency identifiers for said plurality of enhancement layers;
   encoding enhancement layers having different values for said dependency identifiers from said plurality of enhancement layers using a sequence parameter set;
   providing an identifier for a picture parameter set in a slice header for each of said enhancement layers having different values for said dependency identifiers, wherein the picture parameter set comprises an identifier referencing said sequence parameter set;
   wherein said sequence parameter set comprises at least one of the group comprising profile information, level information indicating a required decoder performance for a profile, chroma format information, picture size information and frame crop information, and
   providing said sequence parameter set in the scalable bitstream.

2. A method comprising:
   decoding an encoded scalable video bitstream by receiving a plurality of enhancement layers from encoded scalable video bitstream;
   decoding dependency identifiers for said plurality of enhancement layers;
   receiving a sequence parameter set;
   receiving an identifier for a picture parameter set in a slice header for each of said enhancement layers having different values for said dependency identifiers, wherein the picture parameter set comprises an identifier referencing said sequence parameter set,
   wherein said sequence parameter set comprises at least one of the group comprising profile information, level information indicating a required decoder performance for a profile, chroma format information, picture size information and frame crop information; and
   decoding enhancement layers having different values for said dependency identifiers from said plurality of enhancement layers using the parameter values from the said sequence parameter set.

3. An encoder, operative according to a method of encoding video into a scalable bitstream as claimed in claim 1.

4. A decoder, operative according to a method of decoding an encoded scalable video bitstream as claimed in claim 2.

5. A non-transitory computer readable storage medium stored with code thereon for execution by a computer processor, wherein said computer program code comprises instructions for performing a method of encoding video into a scalable bitstream according to claim 1.

6. A non-transitory computer readable storage medium stored with code thereon for execution by a computer processor, wherein said computer program code comprises instructions for performing a method of decoding an encoded scalable video bitstream according to claim 2.

7. An apparatus comprising
   a base layer encoder configured to generate a base layer based on a video signal; and
   an enhancement layer encoder configured to
   generate a plurality of enhancement layers comprising a first enhancement layer and a second enhancement layer based on the video signal and the base layer,
   generate a first dependency identifier for said first enhancement layer and a second dependency identifier for said second enhancement layer, wherein the values of the second dependency identifier is different from the value of the first dependency identifier,
   determine a sequence parameter set for use for said first enhancement layer and said second enhancement layer,
   provide an identifier for a picture parameter set in a slice header for each of said enhancement layers having different values for said dependency identifiers, wherein the picture parameter set comprises an identifier referencing said sequence parameter set, wherein said sequence parameter set comprises at least one of the group comprising profile information, level information indicating a required decoder performance for a profile, chroma format information, picture size information and frame crop information; and
   encode said first enhancement layer and said second enhancement layer by using said sequence parameter set.

8. An apparatus comprising
   a base layer decoder configured to decode a base layer of the encoded scalable video bitstream; and
   an enhancement layer decoder configured to:
   receive a plurality of enhancement layers from encoded scalable video bitstream,
   decode dependency identifiers for said plurality of enhancement layers,
   receive a sequence parameter set,
   receive an identifier for a picture parameter set in a slice header for each of said enhancement layers having different values for said dependency identifiers, wherein the picture parameter set comprises an identifier referencing said sequence parameter set wherein said sequence parameter set comprises at least one of the group comprising profile information, level information indicating a required decoder performance for a profile, chroma format information, picture size information and frame crop information; and
   decode enhancement layers having different values for said dependency identifiers from said plurality of enhancement layers using the parameter values from the said sequence parameter set.

* * * * *